United States Patent
van Schaik

(10) Patent No.: US 9,645,817 B1
(45) Date of Patent: May 9, 2017

(54) CONTEXTUAL DEVELOPER RANKING

(71) Applicant: SEMMLE LIMITED, Oxford (GB)

(72) Inventor: Sebastiaan Johannes van Schaik, Oxford (GB)

(73) Assignee: Semmle Limited, Oxford (GB)

( * ) Notice: Subject to any disclaimer, the term of this patent is extended or adjusted under 35 U.S.C. 154(b) by 0 days.

(21) Appl. No.: 15/277,913

(22) Filed: Sep. 27, 2016

(51) Int. Cl.
G06F 9/44 (2006.01)
G06F 9/45 (2006.01)
G06F 17/30 (2006.01)
G06N 5/04 (2006.01)
G06N 99/00 (2010.01)

(52) U.S. Cl.
CPC .......... G06F 8/77 (2013.01); G06F 8/75 (2013.01); G06F 17/3053 (2013.01); G06N 5/04 (2013.01); G06N 99/005 (2013.01)

(58) Field of Classification Search
None
See application file for complete search history.

(56) References Cited

U.S. PATENT DOCUMENTS

| 7,505,952 B1* | 3/2009 | Engler ............... G06F 11/3616 706/47 |
| 7,647,579 B2 | 1/2010 | Drissi et al. |
| 7,778,866 B2 | 8/2010 | Hughes |
| 7,975,257 B2* | 7/2011 | Fanning .................... G06F 8/75 717/107 |
| 8,499,278 B2 | 7/2013 | Hughes |
| 8,856,725 B1* | 10/2014 | Anderson ................. G06F 8/75 717/103 |
| 9,104,997 B1* | 8/2015 | Balasubramanian .. G06Q 10/06 |
| 9,304,760 B2 | 4/2016 | Hey, Jr. et al. |
| 9,305,279 B1* | 4/2016 | Menzel ............ G06Q 10/06398 |
| 2005/0223354 A1* | 10/2005 | Drissi ....................... G06F 8/36 717/114 |
| 2010/0050160 A1* | 2/2010 | Balasubramanian ..... G06F 8/33 717/126 |
| 2010/0262473 A1 | 10/2010 | Hughes |
| 2011/0055799 A1* | 3/2011 | Kaulgud ............ G06F 11/3616 717/101 |
| 2013/0007704 A1 | 1/2013 | Haynes et al. |
| 2014/0040871 A1* | 2/2014 | Schwan .................... G06F 8/71 717/141 |

(Continued)

OTHER PUBLICATIONS

Somasundaram et al., "Determination of Competency of Programmers by Classification and Ranking using AHP," © 2015 IEEE.*

(Continued)

Primary Examiner — Insun Kang
(74) Attorney, Agent, or Firm — Fish & Richardson P.C.

(57) ABSTRACT

Methods, systems, and apparatus, including computer programs encoded on computer storage media, for computing a contextual ranking for a developer. One of the methods includes computing a predicted violation value for each developer in a context group. An actual violation value is computed for each developer in the context group. A score for each developer in the context group is computed, wherein the score represents a distance between the actual violation value for the developer and the predicted violation value for the developer. A contextual ranking is generated of the plurality of developers in the context group based on the score for each developer in the context group.

30 Claims, 5 Drawing Sheets

(56) References Cited

U.S. PATENT DOCUMENTS

| | | | | |
|---|---|---|---|---|
| 2014/0123110 A1* | 5/2014 | Wan | ................... | G06F 11/3672 |
| | | | | 717/124 |
| 2014/0137074 A1* | 5/2014 | Hey | ............... | G06Q 10/063112 |
| | | | | 717/101 |
| 2015/0213082 A1* | 7/2015 | Frankel | ............... | G06F 17/3053 |
| | | | | 707/758 |
| 2015/0309790 A1* | 10/2015 | Henriksen | ......... | G06F 17/30106 |
| | | | | 717/121 |
| 2015/0324732 A1* | 11/2015 | Balasubramanian | .. | G06Q 10/06 |
| | | | | 717/102 |
| 2015/0370690 A1* | 12/2015 | Rodmell | ................... | G06F 8/72 |
| | | | | 717/124 |
| 2016/0004517 A1* | 1/2016 | Safary | .................... | G06F 8/436 |
| | | | | 717/131 |
| 2016/0004627 A1* | 1/2016 | Farchi | ................. | G06F 11/3688 |
| | | | | 717/127 |

OTHER PUBLICATIONS

Nguyen et al., "Inferring Developer Expertise through Defect Analysis," 2012 IEEE.*

Ding et al., "Extraction of Java program fingerprints for software authorship identification," © 2003 Elsevier Inc.*

* cited by examiner

CONTEXTUAL DEVELOPER RANKING

BACKGROUND

This specification relates to static analysis of computer software source code.

Static analysis refers to techniques for analyzing computer software source code without executing the source code as a computer software program.

Source code is typically maintained by developers in a code base of source code using a version control system. Version control systems generally maintain multiple revisions of the source code in the code base, each revision being referred to as a snapshot. Each snapshot includes the source code of files of the code base as the files existed at a particular point in time.

Relationships among snapshots stored in a version control system can be represented as a directed, acyclic revision graph. Each node in the revision graph represents a commit of some portion of the source code of the code base. Each commit identifies source code of a particular snapshot as well as other pertinent information about the snapshot, such as the author of the snapshot and data about ancestors of the commit in the revision graph. A directed edge from a first node to a second node in the revision graph indicates that a commit represented by the first node occurred before a commit represented by the second node, and that no intervening commits exist in the version control system.

A static analysis system can identify characteristic segments of source code in the snapshot. For example, a static analysis system can identify violations in the source code of a particular set of coding standards. A static analysis system can also identify a responsible contributor for each characteristic segment of source code and attribute the characteristic segment to the responsible contributor, e.g., to a particular developer or group of developers.

A static analysis system can rank developers according to violation counts. For example, the system can keep track of how many violations each developer introduces into the code base and how many violations each developer removes from the code base.

SUMMARY

This specification describes how a system can provide developer rankings that are meaningful and motivational for developers. To do so, the system can compute for each developer a ranking of that developer relative to developers in a context group for the developer.

In general, one innovative aspect of the subject matter described in this specification can be embodied in methods that include the actions of obtaining data representing a plurality of developer actions for a developer, wherein each developer action is a violation introduction attributed to the developer, a violation removal attributed to the developer, an added line of source code attributed to the developer, or a unit of churn attributed to the developer; obtaining a plurality of characteristic metric values for the developer; determining a context group for the developer based on the characteristic metric values for the developer, the context group comprising the developer and one or more other developers having respective characteristic metric values that are most similar to the characteristic metric value for the developer among a population of developers; computing a predicted violation value for each developer in the context group, wherein the predicted violation value represents a predicted measure of violation introductions attributed to the developer; computing an actual violation value for each developer in the context group, wherein the actual violation value represents a measure of violation introductions attributed to the developer; computing a score for each developer in the context group, wherein the score represents a distance between the actual violation value for the developer and the predicted violation value for the developer; and generating a contextual ranking of the plurality of developers in the context group based on the score for each developer in the context group. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The predicted violation value represents a predicted net violation value representing a predicted measure of violation introductions attributed to the developer compared to violation removals attributed to the developer. The actions include receiving a request from the developer for developer metrics for the developer; and providing, in response to the request, a user interface presentation that presents a contextual rank of the developer relative to the other developers in the context group. The user interface presentation presents a change in the rank of the developer within the context group. Determining a context group for the developer based on the characteristic metric value for the developer comprises determining a predetermined number of developers having respective measures of churn or lines of code added that are most similar to corresponding metrics for the developer. The actions include selecting the predetermined number of developers from a population of developers comprising developers who contributed source code to any of multiple projects analyzed by a distributed static analysis system. The actions include filtering the context group by a particular attribute. The particular attribute is a geographic location, team membership, or a level of seniority. Computing the predicted violation value for a developer comprises uses a predictive model trained to provide a predicted violation value for a particular input attribute. The particular input attribute is a count of lines of code added or churn. The predictive model is trained using developer actions for all developers of all projects analyzed by a distributed static analysis system. The predictive model is trained using developer actions for a plurality of projects written in a particular programming language. The predictive model is trained using a commit history for the developer. The predictive model is trained using a commit history for developers in the context group. Computing the score for a developer comprises computing an absolute distance between the predicted violation value and the actual violation value. Computing the score for a developer comprises computing a relative distance between the predicted violation value and the actual violation value. Computing the score for a developer comprises computing an average between a first ranking based on an absolute distance between the predicted violation value and the actual violation value and a second ranking based on a relative distance between the predicted violation value and the actual violation value.

Particular embodiments of the subject matter described in this specification can be implemented so as to realize one or more of the following advantages. A developer can see a rank that compares the developer to other developers that are similar to the developer in terms of contribution, experience, seniority, location, or any other such metric. This gives developers motivation to be more engaged and to improve their coding skills because it provides real and attainable opportunities to improve the developer's rank. This can be more helpful and more motivational than ranking a developer against thousands of other developers, which might be ignored or deemed meaningless. Additionally, it provides people in managerial positions with insight on the relative performance of developers in their teams.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

A static analysis system can compute a contextual ranking for a developer. In this specification, where reference is made to a "developer," the term "developer" can refer equally to an individual developer, a team of developers in an organization, or some other group of multiple developers.

In the systems described below, the contributions of developers are measured based on developer actions. Each developer action can be a line of code changed, a unit of churn, a violation introduction, or a violation removal attributed to the developer. Some developer actions may be overlapping. For example, a developer committing one line of source code that introduces one violation can be considered to have contributed two developer actions. Similarly, a developer committing a change to one line of source code that introduces one violation and removes another violation can be considered to have contributed three developer actions, a unit of churn, the removal of one violation, and the introduction of another violation.

In general, a source code violation is a segment of source code that includes a violation of a particular coding standard. The segment of source code that violates such a coding standard may thus be referred to as a coding defect. Coding defects can be represented by data elements that uniquely identify the coding defects as violations of a coding standard. These data elements will be referred to simply as violations.

Common metrics for violations include violations introduced by a particular developer, which are coding defects that the developer contributed to the code base; violations removed by a particular developer, which are coding defects that the developer removed from the code base; and a net violation count, which is the difference between violations introduced and violations removed by the developer.

A static analysis system can use the techniques described below to rank developers using any measure of positive and negative contributions to one or more code bases. For example, a system can use, as a measure of contributions to a code base, a count of bugs removed, issues resolved, or compiling or linking errors introduced or removed by developers, to name just a few examples.

Figure 1:
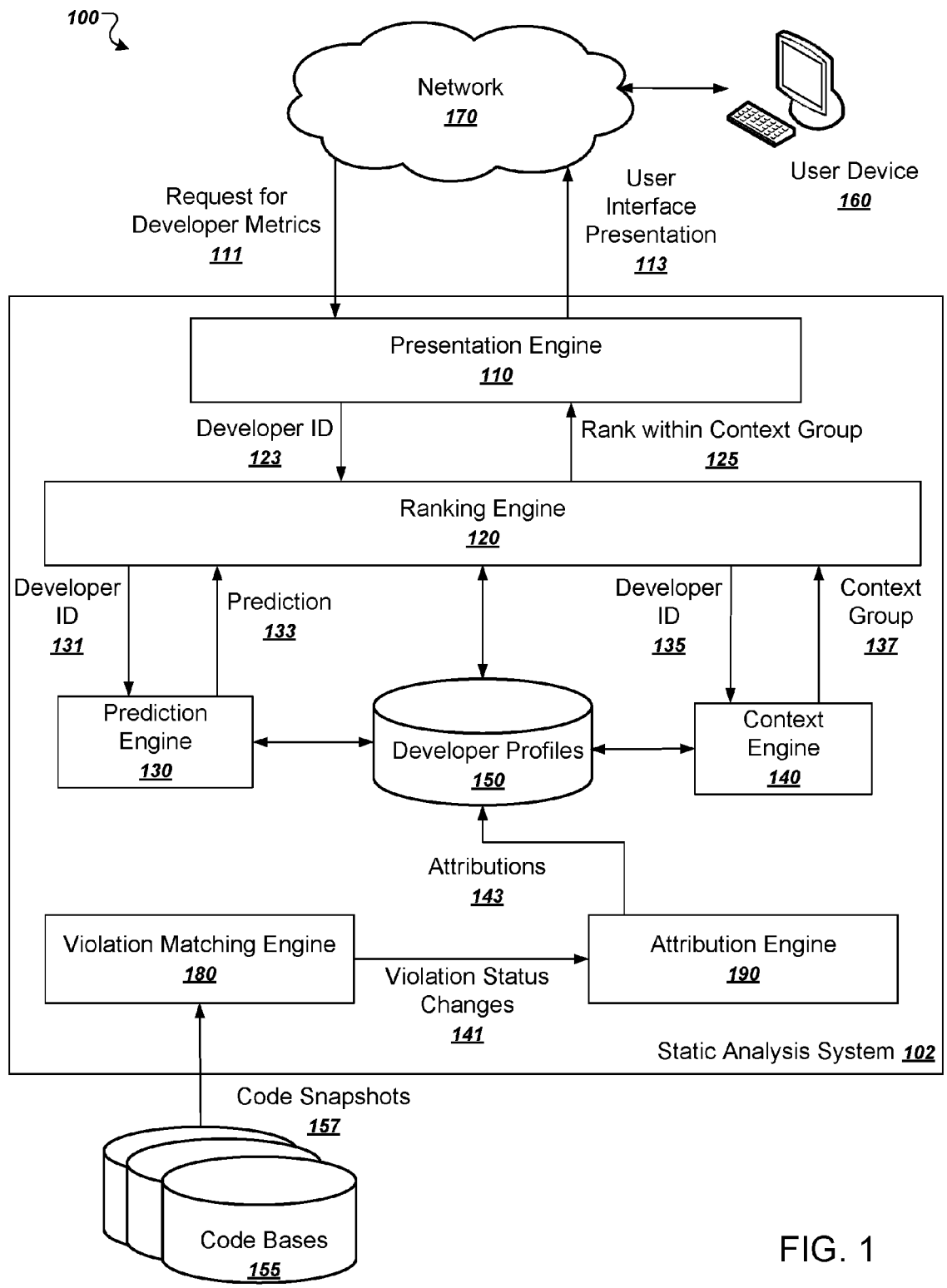
FIG. 1 is a diagram that illustrates an example system.

FIG. 1 is a diagram that illustrates an example system 100. The system 100 includes a user device 160 in communication with a static analysis system 102 over a network 170. The static analysis system 102 is an example system that can be implemented as a cloud-based system for performing distributed static analysis for a single project or across multiple projects.

The static analysis system 102 includes several components, including a presentation engine 110, a ranking engine 120, a prediction engine 130, a context engine 140, a collection of developer profiles 150, a violation matching engine 180, and an attribution engine 190. The components of the static analysis system 102 can be implemented as computer programs installed on one or more computers in one or more locations that are coupled to each through a network. In a cloud-based static analysis system, these components can be implemented by individual computing nodes of a distributed computing system.

A user of user device 160 can use the static analysis system 102 to obtain developer metrics of developers who contribute source code to one or more code bases 155. Each of the code bases 155 comprises one or more snapshots. The snapshots of the one or more code bases 155 can be stored as part of the static analysis system 102 or in an external storage system.

The developer metrics represent characteristics of developer actions as represented by their contributions to the one or more code bases 155. The characteristics of developer actions for each developer can be stored in the collection of developer profiles 150. The collection of developer profiles 150 associates each developer with one or more metrics corresponding to individual developer actions or relationships between developer actions for one or more of the code bases 155. For example, the metrics can include churn, lines of code added, violations introduced, violations removed, and a net of violations introduced versus violations removed, to name just a few examples.

To generate the developer metrics and populate the collection of developer profiles 150, the system 102 can use a violation matching engine 180 and an attribution engine 190.

The violation matching engine 180 identifies source code violations that occur in each code snapshot 157 of the code bases 155. The violation matching engine 180 can also determine which of the violations are matching violations between adjacent snapshots in a revision graph of the code base. Non-matching violations between snapshots in the revision graph represent violation status changes 141, which are either violations newly introduced into the code base by a particular snapshot, or violations newly removed from the code base by a particular snapshot.

The attribution engine 190 receives the violation status changes 141 from the violation matching engine 180. The attribution engine 190 then determines a responsible entity for each of the violation status changes 141, which can be an individual developer, a team of developers within an organization, or another group of developers. The attribution engine 190 then stores the attributions 143 or metrics related to the attributions or both in the collection of developer profiles 150. For example, the attribution engine 190 can store, for each developer in the collection of developer profiles 150, data representing violation introductions attributed to the developer, violation removals attributed to the developer, and the lines of churn attributed to the developer.

Example processes for matching violations and attributing violation status changes are described in commonly owned U.S. Patent Application No. 61/983,932, for "Source Code Violation Matching and Attribution," to Henriksen et al., which is incorporated here by reference. Alternatively, the violation status changes 141 and corresponding attributions 143 can be obtained from other sources rather than being computed by the static analysis system 102.

A prediction engine 130 uses the data stored in the collection of developer profiles 150 to generate one or more predictive models that output predicted violation behavior for developers. For example, the model can generate a predicted violation count for developers who have (net) added a particular number of lines of code to the code base. For example, for a developer who has added 1000 lines of code, the model can indicate that this developer is expected to have introduced 20 violations or to have introduced 20 more violations than the developer removed.

A context engine 140 uses the data stored in the collection of developer profiles 150 to generate a context group for a particular developer. A context group is a group of developers that are similar to the particular developer and that the particular developer will be ranked relative to. The context group engine 140 thus provides the functionality for the static analysis system 102 to generate a contextual ranking of developers, which is a ranking of similar or comparable developers.

The ranking engine 120 ranks developers uses the developer profiles 150 and the outputs of both the prediction engine 130 and the context engine 140. For a particular developer, the ranking engine 120 provides a developer ID 135 to the context engine 140, and the context engine 140 generates a context group 137 for the developer. For each developer in the context group, the ranking engine 120 provides a developer ID 131 to the prediction engine 130, and the prediction engine 130 generates a prediction 133. The ranking engine can then compare the prediction 133 to the actual data stored in the collection of developer profiles 150 in order to compute a score used for ranking the developer.

A user can submit a request for developer metrics 111 to the static analysis system 102 over the network 170. The network can be any appropriate data communications network, e.g., one that includes an intranet, the Internet, or some combination of these.

A presentation engine 110 receives the request 111 and provides a developer ID 123 corresponding to the request to a ranking engine 120. The request 111 itself can include a developer ID 123 for a particular developer. In some implementations, the system 102 determines the developer ID 123 according to a developer who is logged into the system 102 at the user device 160.

The ranking engine 120 receives the developer ID 123 and generates a rank of the developer within the developer's context group 125, which the ranking engine 120 provides back to the presentation engine 110.

The presentation engine 110 then provides a user interface presentation 113 back to the user device 160 over the network 170. The user interface presentation 113 presents the rank of the developer within the developer's context group, e.g., as a hypertext markup language (HTML) or Extensible Markup Language (XML) document for display by a web browser. Some implementations include an application for the user device 160 that implements a user interface and can display, in a text or graphical form, data received from the presentation engine 110. For user devices that are smart phones, the application can be what is referred to as an "app."

Figure 2:
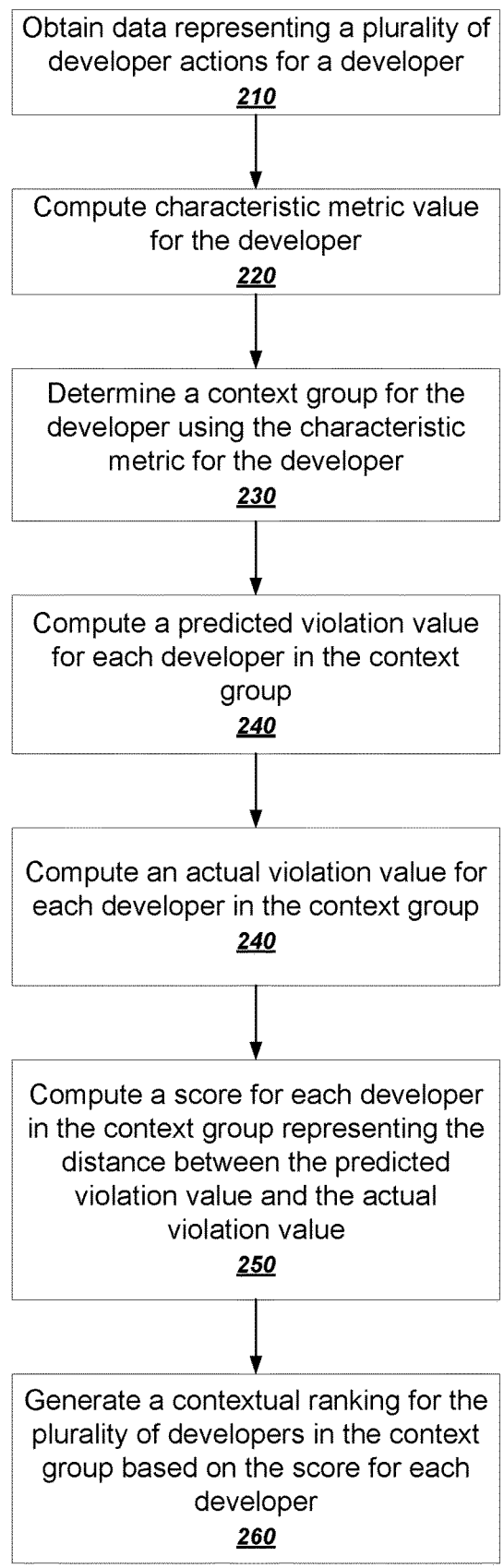
FIG. 2 is a flow chart of an example process for ranking developers.

FIG. 2 is a flow chart of an example process for ranking developers. The system can use the example process to generate a score for a developer in order to rank the developer relative to other developers in a context group, which may be referred to as a contextual rank for the developer. The process can be implemented by one or more computer programs installed on one or more computers. The process will be described as being performed by a system of one or more computers, e.g. the static analysis system 102 of FIG. 1.

The system obtains data representing a plurality of developer actions for a developer (210). As described above, the developer actions can include violation introductions, violation removals, lines of code added, and units of churn attributed to the developer.

The system computes a characteristic metric value for the developer (220). The characteristic metric is a metric that the system will use to identify other developers whose developer actions are most similar to the developer actions for the developer. The system can use any appropriate metric to identify other developers that are similar to the developer. In some implementations, the system use total lines of code added or churn attributed to the developer, or some combination of these, as the characteristic metric.

The system determines a context group for the developer using the characteristic metric value for the developer (230). In other words, the system identifies other developers in a population of developers who have characteristic metric values that are most similar to the developer. The population of other developers can be developers who contribute source code to a same project as the developer. The population of other developers can also include developers who contribute source code to any of multiple projects analyzed by the static analysis system.

In some implementations, the system uses windowing to identify the context group. For example, the system the system can rank all developers in the population of developers by their respective characteristic metric values. The system can then segment the ranking into different overlapping or nonoverlapping windows of fixed or variable size, where the developers in the window having a particular developer defines a context group for the particular developer. The system can also use any appropriate clustering technique to cluster developers according to one or more of the characteristic metric values.

The system can also constrain the context group by one or more other attributes. For example, after identifying similar developers from the population of developers, the system can further filter the context group so that all developers in the context group have an attribute in common. One example filtering application includes filtering the context group by location or geographic region so that the developer is only ranked relative to developers who work at the same work site or region. Another example includes filtering the context group so that all members are part of the same software developer project or team. Yet another example includes filtering the context group by seniority or years of experience so that the developer is only ranked relative to developers having similar amounts of experience or skill.

The system computes a predicted violation value for each developer in the context group (240). The system can train a predictive model that generates a predicted violation value for each developer based on some combination of input attributes of the developer. Training the predictive model will be described in more detail below with reference to FIG. 3.

The input attributes may or may not be the same as the metric used for the characteristic metric value that defined the context group. For example, the system can use churn to define the context group, while using lines of code added as the input attribute for generating the predicted violation value. This can be because violation values are strongly correlated with lines of code added. In other words, developers who contribute more lines of code tend to introduce more violations. On the other hand, churn also counts modifications and deletions, which can be a good indicator for how productive (or senior) the developer is, but which is not a good predictor for the number of violations added. For example, someone who modifies 1000 existing lines of code is a prolific developer, but is likely to have introduced fewer violations than someone who added 1000 new lines of code.

The system computes an actual violation value for each developer in the context group (250). The actual violation value represents a measure of violation introductions attributed to the developer compared to violation removals attributed to the developer. The actual violation value can be a count of violations introduced by the developer. Alternatively, the actual violation value can be computed as violations introduced minus violations removed, or vice versa. Thus, the actual violation value can be a positive or a negative number.

The system computes a score for each developer in the context group (260). The score represents a distance between the actual violation value for the developer and the predicted violation value for the developer.

For example, the system can compute the score as an absolute distance between the predicted violation value and the actual violation value, e.g., by subtracting the predicted violation value from the actual violation value. A positive score means that a contributor was responsible for fewer violations than expected, a negative score indices the opposite.

The system can also compute the score as a relative distance between the predicted violation value the actual violation value, e.g., by dividing the predicted violation value by the actual violation value, or vice versa. Using the relative distance can be less helpful for comparing developers who have contributed small amounts of code to the code base. For example, if a developer was predicted to have contributed 2 violations but actually contributed 4 violations, the relative distance (50%) can be somewhat misleading. Similarly, the absolute distance can provide misleading results for developers with a large number of (expected and/or actual) violations.

The system can also compute the score using some appropriate combination of the absolute distance and the relative distance. For example, the system can compute a first rank for the developer in the context group according to the absolute distance and a second rank for the developer in the context group according to the relative distance. The system can then compute some combined (e.g. average) rank as the score for the developer.

The system generates a contextual ranking for the plurality of developers in the context group based on the score for each developer (270). After ranking the developers in the context group, the system can provide a user interface presentation that presents the rank of the developer within the context group, which will be described in more detail below with reference to FIG. 4.

Figure 3:
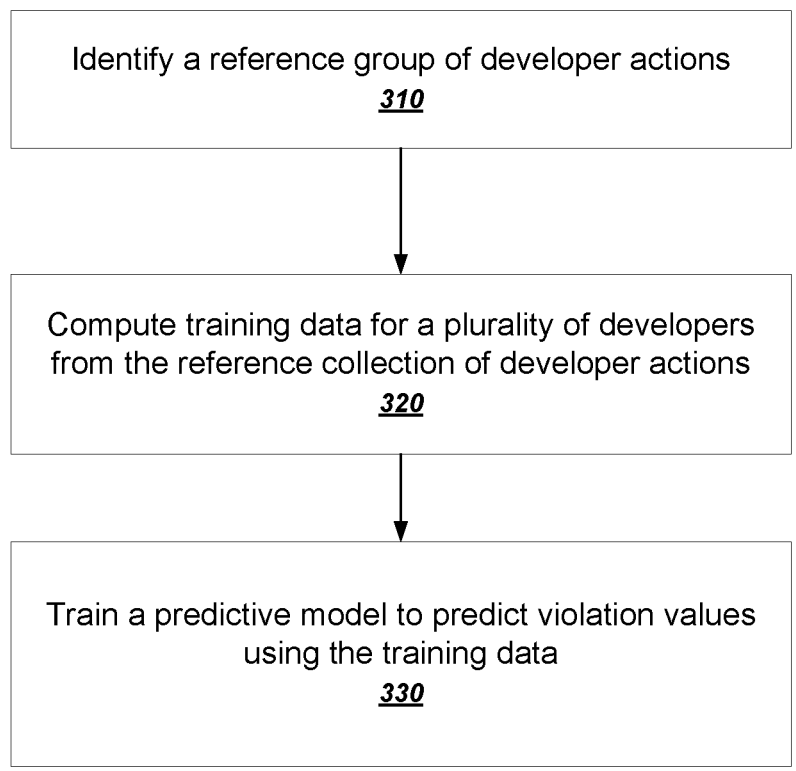
FIG. 3 is a flow chart of an example process for training a predictive model for predicting a net violation value.

FIG. 3 is a flow chart of an example process for training a predictive model for predicting a net violation value. The process can be implemented by one or more computer programs installed on one or more computers. The process will be described as being performed by a system of one or more computers, e.g. the prediction engine 130 of FIG. 1.

The system identifies a reference collection of developer actions (310). A distributed static analysis system may have access to source code attribution information for thousands of developers contributing source code to thousands of software projects. The system can choose any appropriate portion of the contributed source code as a reference collection of developer actions in order to compute a predictive model. For example, the system can use developer actions in all projects, developer actions in projects written in a particular programming language, developer actions in a subset of projects, developer actions in a single project, developer actions for developers in a particular context group, or developer actions for a single developer, in addition to any other appropriate reference collection of developer actions. In some implementations, the system defines developer actions the developer being ranked, e.g., as described above with reference to FIG. 2, as the reference collection.

The system computes training data for plurality of developers from the reference collection of developer actions (320). The training data will generally specify for a particular input attribute of a developer an actual violation value for the developer.

Thus, the system can compute, for each developer of one or more developers represented in the reference collection of developer actions, an input attribute and a corresponding actual violation value for the developer. For example, if the input attribute is lines of code added, the system can compute for a developer a total number of lines of code added by the developer. The system can then also compute a measure of the violations contributed by the developer. The measure of violations contributed by the developer can be either a number violations introduced or a net violation value that represents violations introduced minus violations removed by the developer.

The system trains a predictive model to predict violation values using the training data (330). The system can use any appropriate statistical or machine learning technique to train the predictive model, e.g., linear regression, least-squares, non-linear regression, to name just a few examples.

Figure 4:
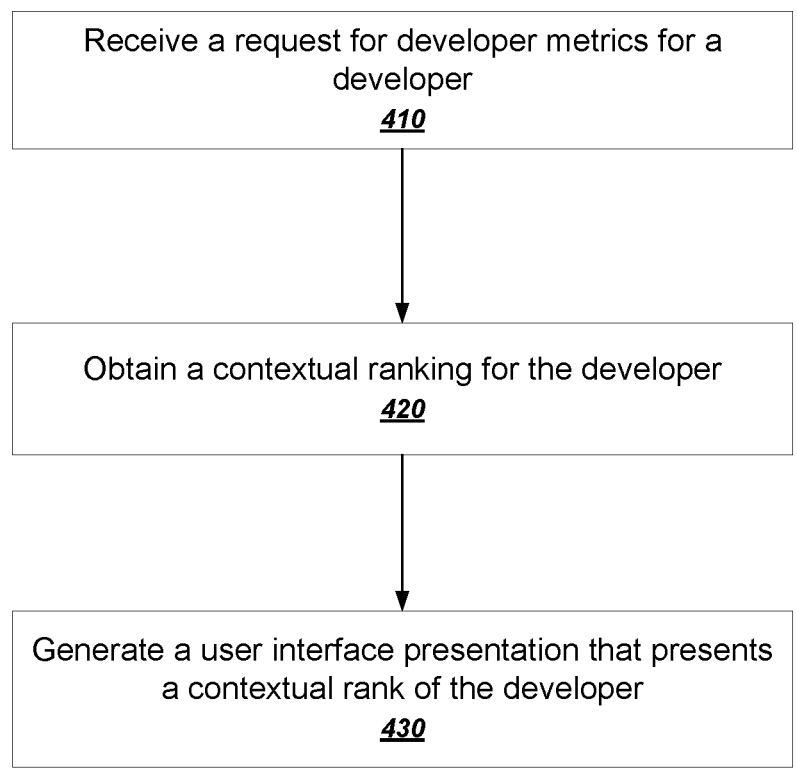
FIG. 4 is a flow chart of an example process for generating a user interface presentation.

FIG. 4 is a flow chart of an example process for generating a user interface presentation. The process will be described as being performed by a system of one or more computers, e.g. the static analysis system 102 of FIG. 1.

The system receives a request for developer metrics for a developer (410). For example, a user can provide a request to a distributed static analysis system to provide a ranking for a developer relative to other developers similar to the developer.

The user of the request may or may not be developer. For example, if a developer logs into the system, the system can treat the login as a request for developer metrics for the developer. Or a project manager of a particular project can provide the request for ranking information for developers working on the project.

The system obtains a contextual ranking for the developer (420). The system can obtain the rank for the developer relative to one or more other developers in the developer's context group, as described above with reference to FIG. 2.

The system generates a user interface presentation that presents a contextual rank of the developer (430). The presentation can include a graphical element, e.g., a badge, that indicate the developer's contextual rank among developers in the context group.

The presentation can also include information about the context group itself. For example, the presentation can indicate a reference range, e.g., of churn or lines of code, for the metric defining the context group. For example, the presentation can indicate that a developer is "15th among developers contributing 1000 to 10,000 units of churn to Project X."

The presentation can also include information about trends in the developers' contextual ranking. For example, the presentation can indicate that within the last quarter, the developer's contextual ranking has improved by 5, 15, or 25 places.

Additionally, the presentation can include hints on how to improve a developer's ranking. For example, the presentation can include a list of violations or violation types that, if fixed, would improve the developer's rank. To do so, the system can rank violation types introduced by the developer according to how often each violation type occurs. The system can then suggest violation types that occur the most often as areas in which the developer can most rapidly improve her rank.

The presentation can also include change warnings that inform a developer of an impending drop in ranking when the developer has proposed incorporating changes to a project. These proposed changes are sometimes referred to as a "pull request." A pull request can be a request to incorporate features of a feature branch, which is a sequence of one or more snapshots of a revision graph of the project that implement one or more changes, e.g., new features to the project. These changes will be introduced into the project by merging the last snapshot of the sequence back into a snapshot on the main branch of the project's revision graph.

To generate the change warning, the system can separately analyze source code for a pull request and compute an updated contextual developer rank for the developer. The system can then compare a current contextual developer rank for the developer with the updated contextual developer rank for the developer to generate the change warning.

The system provides the user interface presentation in response to the request (440).

Figure 5:
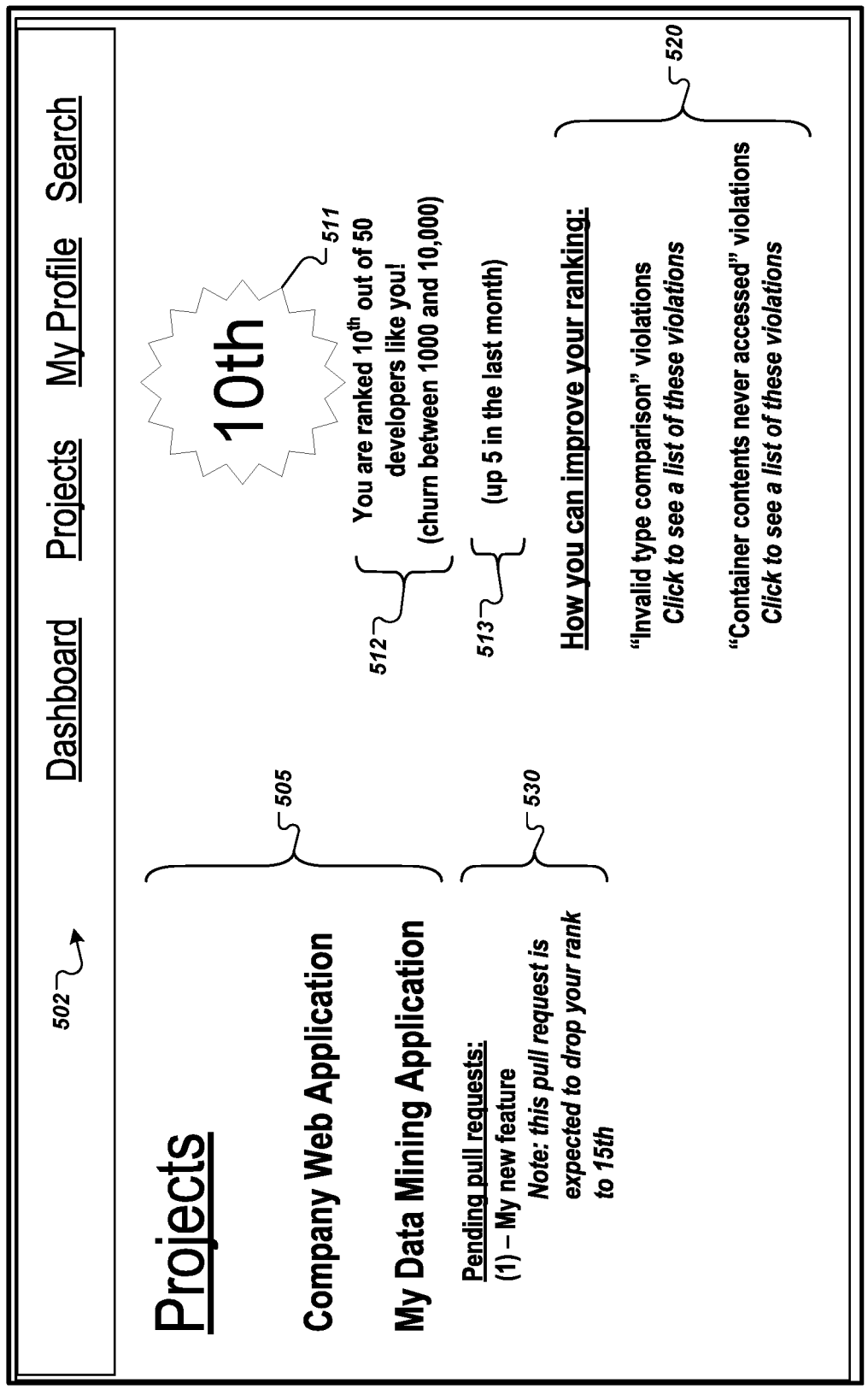
FIG. 5 illustrates an example user interface presentation.
Like reference numbers and designations in the various drawings indicate like elements.

FIG. 5 illustrates an example user interface presentation 500. The presentation 500 is an example of a user interface in which a static analysis system can provide contextual ranking information. The presentation 500 can be provided as part of a website that serves as a web interface to a distributed static analysis system.

The presentation 500 includes a menu bar 502 for navigating within the website. When a developer logs into the website, the website can display information associated with the developer, e.g., projects that the developer is working on; stats for the developer, the developer's team within an organization, or the developer's organization, to name just a few examples; and profile information for the developer. For example, the "Dashboard" page can provide statistics for the developer. The "Projects" page can include information about which projects the developer is working on. The "My Profile" page can include information about the developer and can allow the developer to edit his or her profile. The "Search" page can allow the developer to search for other projects, other developers, or information related to violations identified by the underlying static analysis system. The website can display contextual developer ranking information on any appropriate web page of the website. In the example of FIG. 5, contextual developer ranking information is presented on the "Projects" page of the website.

The "Projects" page of the website lists projects 505 that the developer is a part of, either by virtue of being on a team within an organization or by having contributed source. In this example, the developer has two projects named "Company Web Application" and "My Data Mining Application."

The presentation 500 includes a badge 511 that displays a contextual rank for the developer. The presentation 500 can also include other elements of contextual developer ranking information. For example, along with the badge 511, the presentation 500 can include context group information 512. The context group information 512 includes the information "You are ranked 10th out of 50 developers like you!," indicates the size of the developer's context group. The context group information 512 can also include information like "(churn between 1000 and 10,000)," to provide a user with details on how they have been placed in the context group.

The presentation also includes a change indication 513 that indicates how the developer's contextual rank has changed recently. In this example, the change indication 513 indicates that in the last month, the developer's rank has improved by 5 places.

The presentation 500 also includes suggestions 520 for how the developer can improve her ranking. The suggestions 520 specify two violation types that, if corrected, would be likely to improve the developer's ranking. In this example, the presentation 500 specifies two particular violation types, "Invalid type comparison" and "Container contents never accessed." The presentation 500 can alternative list the violations themselves rather than violation types. The presentation 500 also indicates that by selecting the specified violation types the developer can see examples of violations of each type.

The presentation 500 also includes a change warning 530 that indicates the likely effects of a pending pull request. In this example, a pending pull request for the project named "My Data Mining Application" includes violations that will likely cause the developer's contextual rank to drop to 15th instead of 10th. Thus, the change warning 530 includes that "this pull request is expected to drop your rank to 15th."

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer-implemented method comprising:
obtaining data representing a plurality of developer actions for a developer of source code in one or more code bases, wherein each developer action is a violation introduction into the one or more code bases attributed to the developer, a violation removal from the one or more code bases attributed to the developer, an added line of source code in the one or more code bases attributed to the developer, or a unit of source code change in the one or more code bases attributed to the developer;
obtaining a plurality of characteristic metric values for the developer;
determining a context group for the developer based on the characteristic metric values for the developer, the context group comprising the developer and one or more other developers having respective characteristic metric values that are most similar to the characteristic metric values for the developer among a population of developers;
automatically computing a predicted violation value for each developer in the context group, wherein the predicted violation value represents a predicted measure of violation introductions into the one or more code bases attributed to the developer;
automatically computing an actual violation value for each developer in the context group, wherein the actual violation value represents a measure of violation introductions into the one or more code bases attributed to the developer;
automatically computing a score for each developer in the context group, wherein the score represents a distance between the actual violation value for the developer and the predicted violation value for the developer; and
automatically generating a contextual ranking of a plurality of developers in the context group based on the score for each developer in the context group.

2. The method of claim 1, wherein the predicted violation value represents a predicted net violation value representing the predicted measure of violation introductions attributed to the developer compared to violation removals attributed to the developer.

3. The method of claim 1, further comprising receiving a request from the developer for developer metrics for the developer; and
providing, in response to the request, a user interface presentation that presents a contextual rank of the developer relative to the other developers in the context group.

4. The method of claim 3, wherein the user interface presentation presents a change in a rank of the developer within the context group.

5. The method of claim 1, wherein determining the context group for the developer based on the characteristic metric values for the developer comprises determining a predetermined number of developers having respective measures of churn or lines of code added that are most similar to corresponding metrics for the developer.

6. The method of claim 5, further comprising selecting the predetermined number of developers from a population of developers comprising developers who contributed source code to any of multiple projects analyzed by a distributed static analysis system.

7. The method of claim 5, further comprising filtering the context group by a particular attribute.

8. The method of claim 7, wherein the particular attribute is a geographic location, team membership, or a level of seniority.

9. The method of claim 1, wherein computing the predicted violation value for each developer in the context group comprises using a predictive model trained to provide a predicted violation value for a particular input attribute.

10. The method of claim 9, wherein the particular input attribute is a count of lines of code added or churn.

11. The method of claim 9, wherein the predictive model is trained using developer actions for all developers of all projects analyzed by a distributed static analysis system.

12. The method of claim 9, wherein the predictive model is trained using developer actions for a plurality of projects written in a particular programming language.

13. The method of claim 9, wherein the predictive model is trained using a commit history for each developer.

14. The method of claim 9, wherein the predictive model is trained using a commit history for developers in the context group.

15. The method of claim 1, wherein computing the score for a each developer comprises computing an absolute distance between the predicted violation value and the actual violation value.

16. The method of claim 1, wherein computing the score for a each developer comprises computing a relative distance between the predicted violation value and the actual violation value.

17. The method of claim 1, wherein computing the score for a each developer comprises computing an average between a first ranking based on an absolute distance between the predicted violation value and the actual violation value and a second ranking based on a relative distance between the predicted violation value and the actual violation value.

18. A system comprising:
one or more computers and one or more storage devices storing instructions that are operable, when executed by the one or more computers, to cause the one or more computers to perform operations comprising:
obtaining data representing a plurality of developer actions for a developer of source code in one or more code bases, wherein each developer action is a violation introduction into the one or more code bases attributed to the developer, a violation removal from the one or more code bases attributed to the developer, an added line of source code in the one or more code bases attributed to the developer, or a unit of source code change in the one or more code bases attributed to the developer;
obtaining a plurality of characteristic metric values for the developer;
determining a context group for the developer based on the characteristic metric values for the developer, the context group comprising the developer and one or more other developers having respective characteristic metric values that are most similar to the characteristic metric values for the developer among a population of developers;
automatically computing a predicted violation value for each developer in the context group, wherein the predicted violation value represents a predicted measure of violation introductions into the one or more code bases attributed to the developer;
automatically computing an actual violation value for each developer in the context group, wherein the actual violation value represents a measure of violation introductions into the one or more code bases attributed to the developer;
automatically computing a score for each developer in the context group, wherein the score represents a distance between the actual violation value for the developer and the predicted violation value for the developer; and
automatically generating a contextual ranking of a plurality of developers in the context group based on the score for each developer in the context group.

19. The system of claim 18, wherein the predicted violation value represents a predicted net violation value representing the predicted measure of violation introductions attributed to the developer compared to violation removals attributed to the developer.

20. The system of claim 18, wherein the operations further comprise receiving a request from the developer for developer metrics for the developer; and providing, in response to the request, a user interface presentation that presents a contextual rank of the developer relative to the other developers in the context group.

21. The system of claim 20, wherein the user interface presentation presents a change in a rank of the developer within the context group.

22. The system of claim 18, wherein determining the context group for the developer based on the characteristic metric values for the developer comprises determining a predetermined number of developers having respective measures of churn or lines of code added that are most similar to corresponding metrics for the developer.

23. The system of claim 22, wherein the operations further comprise selecting the predetermined number of developers from a population of developers comprising developers who contributed source code to any of multiple projects analyzed by a distributed static analysis system.

24. The system of claim 22, wherein the operations further comprise filtering the context group by a particular attribute.

25. The system of claim 24, wherein the particular attribute is a geographic location, team membership, or a level of seniority.

26. The system of claim 18, wherein computing the predicted violation value for each developer in the context group comprises using a predictive model trained to provide a predicted violation value for a particular input attribute.

27. The system of claim 26, wherein the particular input attribute is a count of lines of code added or churn.

28. The system of claim 26, wherein the predictive model is trained using developer actions for all developers of all projects analyzed by a distributed static analysis system.

29. The system of claim 26, wherein the predictive model is trained using developer actions for a plurality of projects written in a particular programming language.

30. A computer program product, encoded on one or more non-transitory computer storage media, comprising instructions that when executed by one or more computers cause the one or more computers to perform operations comprising:
obtaining data representing a plurality of developer actions for a developer of source code in one or more code bases, wherein each developer action is a violation introduction into the one or more code bases attributed to the developer, a violation removal from the one or more code bases attributed to the developer, an added line of source code in the one or more code bases attributed to the developer, or a unit of source code change in the one or more code bases attributed to the developer;
obtaining a plurality of characteristic metric values for the developer;
determining a context group for the developer based on the characteristic metric values for the developer, the context group comprising the developer and one or more other developers having respective characteristic metric values that are most similar to the characteristic metric values for the developer among a population of developers;
automatically computing a predicted violation value for each developer in the context group, wherein the predicted violation value represents a predicted measure of violation introductions into the one or more code bases attributed to the developer;
automatically computing an actual violation value for each developer in the context group, wherein the actual violation value represents a measure of violation introductions into the one or more code bases attributed to the developer;

automatically computing a score for each developer in the context group, wherein the score represents a distance between the actual violation value for the developer and the predicted violation value for the developer; and automatically generating a contextual ranking of a plurality of developers in the context group based on the score for each developer in the context group.

\* \* \* \* \*

UNITED STATES PATENT AND TRADEMARK OFFICE
CERTIFICATE OF CORRECTION

PATENT NO. : 9,645,817 B1
APPLICATION NO. : 15/277913
DATED : May 9, 2017
INVENTOR(S) : Sebastiaan Johannes van Schaik Page 1 of 1

It is certified that error appears in the above-identified patent and that said Letters Patent is hereby corrected as shown below:

In the Claims

Column 15, Line 2:   In Claim 15, after "for" delete "a".

Column 15, Line 6:   In Claim 16, after "for" delete "a".

Column 15, Line 10:  In Claim 17, after "for" delete "a".

Signed and Sealed this
Thirteenth Day of August, 2019

Andrei Iancu
*Director of the United States Patent and Trademark Office*